UNITED STATES PATENT OFFICE.

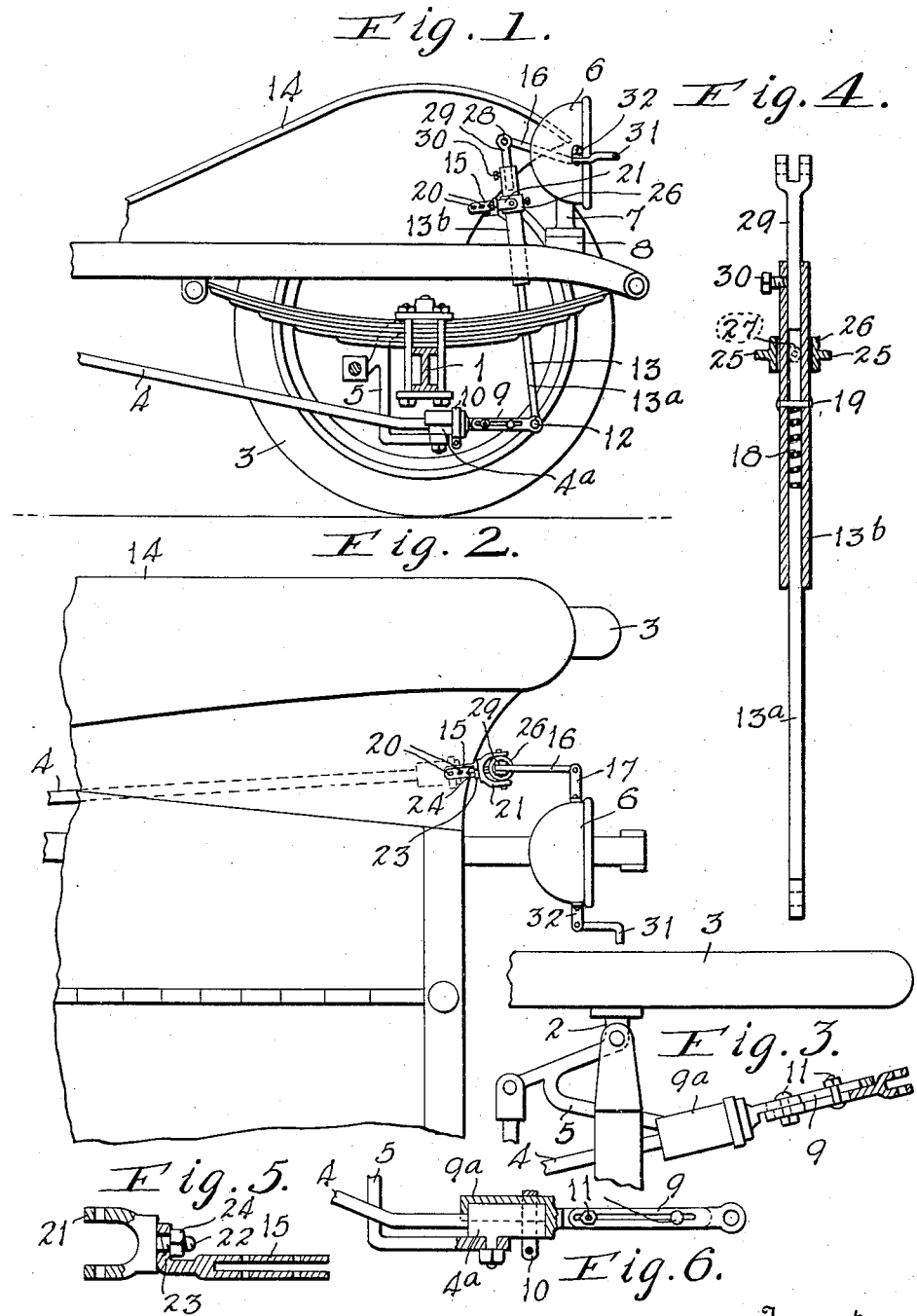

MARTIN L. TAYLOR, OF MENARD, TEXAS.

DIRIGIBLE AUTOMOBILE-HEADLIGHT.

1,240,626.  Specification of Letters Patent.  Patented Sept. 18, 1917.

Application filed November 28, 1916, Serial No. 133,937. Renewed August 7, 1917. Serial No. 184,974.

*To all whom it may concern:*

Be it known that I, MARTIN L. TAYLOR, a citizen of the United States, residing at Menard, in the county of Menard, State of Texas, have invented a new and useful Dirigible Automobile-Headlight; and I do hereby declare the following to be a full, clear, and exact description of the invention, such as will enable others skilled in the art to which it appertains to make and use the same.

The present invention relates to mountings for automobile headlights, and has for its object to provide a novel construction whereby the headlights are operatively connected with the steering gear so that they will turn with the front wheels and always throw the light in the direction in which the machine is moving, thereby enabling sharp turns to be safely made at night.

Further objects of the invention are to provide a device of this character which is comparatively simple and inexpensive in its construction, which can be readily mounted upon conventional types of automobiles, which has no delicate parts to break or get out of repair, and which can be adjusted to fit various types of cars.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a fragmentary vertical longitudinal sectional view through the front end of an automobile, showing the manner of applying a dirigible headlight constructed in accordance with the invention thereto.

Fig. 2 is a top plan view thereof.

Fig. 3 is an enlarged top plan view of one end of the front axle, the mud guard being removed.

Fig. 4 is a vertical sectional view through the pivoted operating lever.

Fig. 5 is a detail view of the supporting bracket and yoke for the operating lever.

Fig. 6 is a detail side elevation of the extension applied to the forward end of the drag link, portions being broken away and shown in section.

Corresponding and like parts are referred to in the following description and indicated in all the views of the drawings by the same reference characters.

For the purpose of illustration the invention is shown as applied to a motor vehicle which is of the conventional construction, the numeral 1 designating the front axle, 2 the steering knuckles, 3 the front wheels, 4 the steering drag link which is connected at its forward end to the steering arm 5 of one of the knuckles 2, and 14 the mud guards for the front wheels. Headlights 6 are arranged upon opposite sides of the car at the forward end thereof, being carried by downwardly projecting stems 7 which are loosely received within bearing sleeves 8 so that the headlights are free to turn about a vertical axis. If found necessary, anti-friction or ball bearings of any conventional type may be provided to reduce the friction and admit of the headlights turning freely without any binding action.

An extension 9 is applied to the head $4^a$ at the forward end of the steering drag link 4. The rear end of the drag link extension 9 is formed with a substantially semicylindrical socket $9^a$ adapted to fit upon the head $4^a$ of the drag link, suitable clamping means 10 being provided for holding the socket rigidly in position. This extension 9 is preferably formed in two sections which are adjustably held together by fastening members 11, the outer section being adapted to be moved in and out to regulate the effective length of the extension. The forward end of the drag link extension 9 is forked and pivotally connected at 12 to the lower end of an upright lever 13, said lever being pivotally engaged at an intermediate point in its length by a bracket 15 which is applied to the forward edge of the mud guard 14, and having the upper extremity thereof operatively connected by a link 16 to an arm 17 projecting from one of the headlights 6.

This upright lever 13 is formed in two sections, the lower section $13^a$ telescoping within the upper tubular section $13^b$, and a coil spring 18 being interposed between the upper end of the section $13^a$ and an abutment 19 in the tubular section $13^b$ to take up any looseness in the members and normally tend to force the lower section $13^a$ downwardly. This telescoping connection between the two sections 13ᵃ and 13ᵇ compensates for the up and down movements of the vehicle body which is supported by the chassis by means of conventional springs.

The bracket 15 may be bifurcated to fit over the edge of the mud guard, and may be rigidly secured in position thereon by suitable fastening members 20. A yoke 21 is carried by the bracket, being formed with a rearwardly extending threaded stem 22 which passes through an upright flange 23 at the forward end of the bracket, and is engaged by a clamping nut 24 to hold the parts in an adjusted position. The yoke 21 can thus be set in different angular positions relative to the bifurcation of the bracket, and this enables the bracket to be used in connection with any make of car, regardless of the inclination of the edge of the mud guard at the point where the bracket is applied. After the bifurcated bracket has been fitted upon the mud guard, the yoke 21 can be turned into a horizontal position and rigidly clamped in this position by tightening the nut 24. The arms of the yoke 21 are pivotally engaged by trunnions 25 which project laterally in opposite directions from a sleeve 26 which is adjustably mounted upon the tubular upper section 13ᵇ of the upright lever. A set screw 27 is provided for locking the sleeve 26 in an adjusted position. The sleeve 26 can thus be moved up and down upon the upright lever as may be required when attaching the device to any particular make of car.

The link 16 at the upper end of the upright lever is shown as loosely connected at 28 to a rod 29 which telescopes within the tubular member 13ᵇ. A set screw 30 enables the rod 29 to be clamped in an adjusted position, and the leverage of the upper end of the upright lever can thus be regulated to obtain just the proper movement of the headlights as the front wheels of the vehicle are turned. The two headlights 6 are operatively connected by a rod 31 so as to turn in unison, said rod being shown in the present instance as loosely connected to arms 32 projecting from the headlights. With this construction it will be obvious that when the front wheels 3 are turned to steer the machine either to the right or to the left, the headlights 6 will be simultaneously rotated to throw the light in the direction in which the machine is traveling.

Having thus described the invention, what I claim as new and desire to secure by Letters Patent, is:—

1. The combination with a motor vehicle and its steering gear, of a headlight carried by the vehicle and mounted to turn about a vertical axis, an upright lever formed in telescoping sections, an operative connection between the lower section of the upright lever and the drag link of a steering gear, a bracket applied to the edge of the mud guard and provided with means for pivotally engaging an intermediate portion of the upright lever, and an operative connection between the upper end of the upright lever and the headlight.

2. The combination with a motor vehicle and its steering gear, of a headlight carried by the vehicle and mounted to turn about a vertical axis, an extension applied to the drag link of the steering gear, an upright lever formed in telescoping sections and having the lower end thereof pivotally connected to the drag link extension, an operative connection between the upper end of the upright lever and the headlight, and a bracket applied to the edge of the mud guard and provided with means for pivotally supporting the upright lever at an intermediate point in the length thereof.

3. The combination with a motor vehicle and its steering gear, of a headlight carried by the vehicle and mounted to turn about a vertical axis, an extension applied to the drag link of the steering gear, a bracket applied to the edge of the mud guard and provided with means for pivotally supporting the upright lever at an intermediate point in the length thereof, a rod adjustably mounted upon the upper end of the upright lever, and a link connection between the rod and the headlight, the adjustment of the rod enabling the leverage of the upright lever to be varied.

4. The combination with a motor vehicle and its steering gear, of a headlight mounted upon the vehicle and mounted to turn about a vertical axis, an upright lever operatively connected at its lower end to the drag link of the steering gear and its upper end to the headlight, a bracket applied to the edge of the mud guard, a yoke adjustably mounted upon the bracket and adapted to be set into various angular relations with respect thereto, and a pivotal connection between the yoke and an intermediate portion of the upright lever.

5. The combination with a motor vehicle and its steering gear, of a headlight carried by the vehicle and mounted to turn about a vertical axis, an upright lever operatively connected at its lower end to the drag link of the steering gear and its upper end to the headlight, a bifurcated bracket applied to the edge of the mud guard and provided with an upright flange, a horizontal yoke formed with a stem which passes through the flange, means for clamping the yoke in a fixed angular position with relation to the bifurcated bracket, and means upon an intermediate portion of the upright lever for pivotally engaging the arms of the yoke.

6. The combination with a motor vehicle and its steering gear, of a headlight carried by the vehicle and mounted to turn about a vertical axis, an upright lever operatively connected at its lower end to the drag link of the steering gear, and its upper end to the headlight, a bracket applied to the edge of the mud guard, a yoke adjustably mounted upon the bracket and adapted to be set into various angular positions with relation thereto, said yoke straddling the upright lever, a collar slidable upon the upright lever and provided with trunnions adapted to engage the arms of the yoke, and means for locking the collar in an adjusted position upon the lever.

In testimony whereof I have signed my name to this specification in the presence of two subscribing witnesses.

MARTIN L. TAYLOR.

Witnesses:
C. L. FERTSON,
J. B. CHRISTIAN.

Copies of this patent may be obtained for five cents each, by addressing the "Commissioner of Patents, Washington, D. C."